(12) United States Patent
Burger et al.

(10) Patent No.: US 10,285,210 B2
(45) Date of Patent: May 7, 2019

(54) METHOD AND SYSTEM FOR REMOTELY CONTROLLING A MOTOR VEHICLE

(71) Applicant: Audi AG, Ingolstadt (DE)

(72) Inventors: Matthias Burger, Kösching (DE); Markus Schwierz, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/329,416

(22) PCT Filed: Jul. 11, 2015

(86) PCT No.: PCT/EP2015/001425
§ 371 (c)(1),
(2) Date: Jan. 26, 2017

(87) PCT Pub. No.: WO2016/041611
PCT Pub. Date: Mar. 24, 2016

(65) Prior Publication Data
US 2017/0215219 A1   Jul. 27, 2017

(30) Foreign Application Priority Data
Sep. 20, 2014   (DE) .................. 10 2014 014 136

(51) Int. Cl.
*H04B 7/212*   (2006.01)
*H04W 76/14*   (2018.01)
(Continued)

(52) U.S. Cl.
CPC .......... *H04W 76/14* (2018.02); *G05D 1/0022* (2013.01); *G05D 1/0027* (2013.01);
(Continued)

(58) Field of Classification Search
USPC ....... 370/328, 255, 322, 323, 325, 336, 338, 370/345, 406, 443, 444, 476
See application file for complete search history.

(56) References Cited

U.S. PATENT DOCUMENTS 8,787,946 B2 * 7/2014 Jensen ................ H04M 1/6033
455/426.1
9,340,197 B1 * 5/2016 Miersch-Wiemers ... B60D 1/26
(Continued)

FOREIGN PATENT DOCUMENTS

DE   102009041587 A1 *  3/2011   ............... B62D 1/00
DE   102009054253 A1    5/2011
(Continued)

OTHER PUBLICATIONS

DE 102009041587 A1, English Machine Translation, Mar. 17, 2011, pp. 1-23.*
(Continued)

*Primary Examiner* — Phuongchau Ba Nguyen
(74) *Attorney, Agent, or Firm* — Sterne, Kessler, Goldstein & Fox P.L.L.C.

(57) ABSTRACT

Methods and systems are presented for remotely controlling a motor vehicle by mobile communication terminal. One method includes displaying motor vehicles by the mobile communication terminal, with which the mobile communication terminal had been previously coupled using a prior wireless connection. Based on an ability to establish a wireless connection concurrently with more than one of the motor vehicles, the method includes: establishing a wireless connection between one of the motor vehicle and the mobile communication terminal in response to detecting that the one of the motor vehicles has been selected, and prohibiting establishment of the new wireless connection between the mobile communication terminal and one of the motor vehicles until the one of the motor vehicles has been selected.

9 Claims, 2 Drawing Sheets

(51) Int. Cl.
*H04W 4/04* (2009.01)
*H04W 76/19* (2018.01)
*H04W 76/34* (2018.01)
*H04W 76/15* (2018.01)
*G05D 1/00* (2006.01)
*G06F 3/0484* (2013.01)

(52) U.S. Cl.
CPC .......... *H04W 4/046* (2013.01); *H04W 76/15* (2018.02); *H04W 76/19* (2018.02); *H04W 76/34* (2018.02); *G06F 3/04842* (2013.01)

(56) References Cited

U.S. PATENT DOCUMENTS

| | | | | |
|---|---|---|---|---|
| 2003/0004613 | A1* | 1/2003 | Hahn | B62D 15/0285 701/1 |
| 2010/0056055 | A1* | 3/2010 | Ketari | H04L 63/068 455/41.3 |
| 2010/0075655 | A1 | 3/2010 | Howarter et al. | |
| 2013/0162421 | A1* | 6/2013 | Inaguma | H04B 5/0031 340/438 |
| 2014/0222252 | A1* | 8/2014 | Matters | B62D 15/027 701/2 |
| 2014/0227979 | A1 | 8/2014 | Maihoefer | |
| 2015/0149022 | A1* | 5/2015 | Harvey | E04H 6/422 701/23 |
| 2016/0027399 | A1* | 1/2016 | Wilde | G06F 13/382 345/520 |

FOREIGN PATENT DOCUMENTS

| | | |
|---|---|---|
| DE | 102010038550 A1 | 2/2012 |
| DE | 102011112626 A1 | 3/2013 |
| GB | 2468126 A | 9/2010 |

OTHER PUBLICATIONS

English-language abstract of German Patent Application Publication No. 102010038550 A1, published Feb. 2, 2012; 2 pages.

English-language abstract of National Application Publication No. WO2011060901 A1, published May 26, 2011; 2 pages.

"Pair a Bluetooth device to Your Volvo—Detailed Guide" (Dec. 10, 2015).

International Search Report and Written Opinion directed to related International Patent Application No. PCT/EP2015/001425, dated Nov. 12, 2015, with attached English-language translation; 27 pages.

International Preliminary Report on Patentability directed to related International Patent Application No. PCT/EP2015/001425, dated Sep. 26, 2016, with attached English-language translation; 12 pages.

* cited by examiner

METHOD AND SYSTEM FOR REMOTELY CONTROLLING A MOTOR VEHICLE

TECHNICAL FIELD

The invention relates to a method and system for remotely controlling a motor vehicle by means of a mobile communication terminal.

BACKGROUND

Usually, a wireless connection is established between a mobile communication terminal, such as a smartphone, a tablet computer or the like, and a motor vehicle according to the so-called "first come, first served" principle. Thus, once the mobile communication terminal has a wireless network of an already-known motor vehicle, a corresponding wireless connection is established with the first available network. Vehicle-specific applications for mobile communication terminals which are, for example, integrated into corresponding infotainment systems of motor vehicles, also offer no possibility of a vehicle network change or a vehicle network selection. A purposeful connection to a vehicle network is only possible via corresponding settings of the relevant mobile communication terminal. To do this, an incorrect connection must first be disconnected and then available networks must be searched. Then, the connection to an available network can be established manually. However, the lack of a possibility of a vehicle network change or of a vehicle network selection by means of a correspondingly designed mobile communication terminal is disadvantageous. The purposeful establishment of a connection is only possible cumbersomely via a settings menu of the relevant mobile communication terminal.

DE 10 2011 112 626 A1 shows an automated coupling method between a mobile communication terminal and a central processor unit of a motor vehicle. In this case, respective data of the mobile communication terminal and the central processor unit of the motor vehicle are exchanged with a back-end server before the automated coupling takes place between the mobile communication terminal and the central processor unit.

DE 10 2010 0385 50 A1 shows a method for controlling actions of several vehicles. For this purpose, a plurality of vehicles can establish a so-called ad-hoc connection, whereby several vehicles can form a communication network.

DE 10 2009 0542 53 A1 shows a communication method for a motor vehicle. The communication method shown there is aimed primarily at hands-free devices in motor vehicles, wherein a plurality of mobile radio devices which can be coupled to the hands-free device are displayed. Once a user has selected one of the displayed mobile phones, a wireless connection is established between the selected mobile phone and the hands-free kit of the respective motor vehicle.

BRIEF DESCRIPTION OF THE DRAWINGS/FIGURES

DETAILED DESCRIPTION

Figure 1:
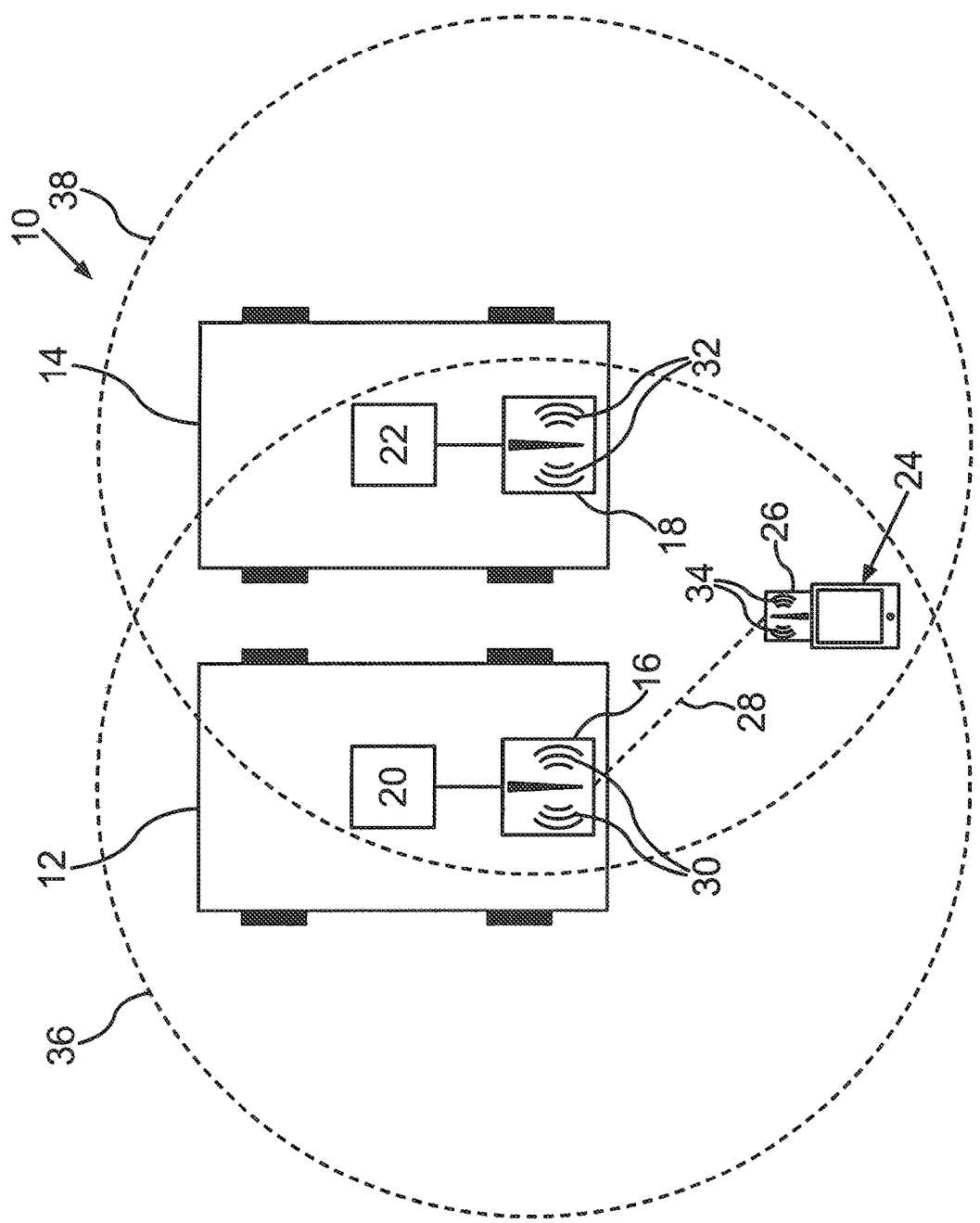
FIG. 1 illustrates a schematic representation of a system for remotely controlling a motor vehicle by means of a mobile communication terminal.

It is the task of the present invention to provide a simplified establishment of a wireless connection between a mobile communication terminal and a motor vehicle for remotely controlling the motor vehicle.

This task is achieved by a method and by a system for remotely controlling a motor vehicle by means of a mobile communication terminal having the features of the independent patent claims. Advantageous embodiments having useful and non-trivial further developments of the invention are indicated in the dependent claims.

In the inventive method for remotely controlling a motor vehicle by means of a mobile communication terminal, all the motor vehicles are displayed by the mobile communication terminal, with which the mobile communication terminal had already been coupled before in the form of a wireless connection. If a wireless connection can be established concurrently with more than one of the indicated motor vehicles, the following procedure is used: Once it has been detected that one of these motor vehicles has been selected, a wireless connection is established between the selected motor vehicle and the mobile communication terminal. As long as none of these motor vehicles has been selected, an automatic establishment of a wireless connection between the mobile communication terminal and these motor vehicles is prohibited.

Preferably, the display of the motor vehicles with which the mobile communication terminal had already been coupled before in the form of a wireless connection is carried out by means of a vehicle-specific and/or function-specific application, which is installed on the mobile communication terminal. The mobile communication terminal thus provides, according to the invention, a kind of selection screen, which displays all the already-known motor vehicles, preferably with a corresponding image, a model designation and/or a name, thereby enabling a targeted connection to a corresponding vehicle network, of the desired motor vehicle. The selection of the motor vehicle to be remotely controlled by means of the mobile communication terminal can thus be effected directly by means of the mobile communication terminal, preferably by means of said application. A user no longer has to select partially cryptic radio connections in corresponding system settings of his mobile communication terminal, but intuitively sees which connection he may select.

Preferably, after starting the vehicle-specific or function-specific application, a display appears, by means of which all of the already-known motor vehicles, that is, all motor vehicles with which the mobile communication terminal had already been coupled before in the form of a wireless connection, are shown. For this purpose, the mobile communication terminal manages a vehicle list with all the already-known motor vehicles and can visualize these to the user. If the user has selected a specific motor vehicle via the mobile communication terminal, an attempt is made to establish a specific connection with this motor vehicle. The wireless connection can be effected, for example, by means of a Bluetooth or a WLAN [Wi-Fi] connection. Essentially, however, all wireless connections, in particular radio links, are suitable for carrying out the inventive method.

In an advantageous embodiment of the invention, it is provided that, by means of the mobile communication terminal, those motor vehicles are marked with which a wireless connection with the mobile communication terminal can be produced instantaneously. For example, the displayed motor vehicles are displayed with an additional symbol, for example a radio symbol or the like, so that a user of the mobile communication terminal can directly see with which of the once already coupled vehicles he can currently establish a wireless connection. For example, it may also be provided that the user receives a pop-up or push message by means of the mobile communication terminal, as soon as at least one of the motor vehicles can be connected to a wireless connection with which the mobile communication terminal had already been coupled before. The user is thereby simply informed that a motor vehicle, which had already been coupled previously, is within range.

According to a further advantageous embodiment of the invention, it is provided that the mobile communication terminal is used to highlight the motor vehicle, with which a wireless connection is established with the mobile communication terminal. By looking at the mobile communication terminal, a user can thus easily identify, with which vehicle his mobile communication terminal is currently coupled.

In an additional advantageous embodiment of the invention, it is provided that, if a wireless connection can be established instantly with only one of the displayed motor vehicles, a wireless connection is automatically established between this motor vehicle and the mobile communication terminal. In other words, it may preferably be provided that an automatic coupling to an already previously coupled vehicle is carried out whenever this is the only motor vehicle, which is within the range of the mobile communication terminal. Alternatively, however, it may be provided just as well that manual selection must always be carried out by means of the mobile communication terminal before a wireless connection is established with a previously coupled motor vehicle.

In an additional advantageous embodiment of the invention, it is provided that as soon as, after the wireless connection between the mobile communication terminal and one of the motor vehicles has been established, another displayed vehicle is selected on the mobile communication terminal, the previously established wireless connection is interrupted, and a wireless connection with the other motor vehicle is established. This makes it possible to change the wireless connection between different motor vehicles with which the mobile communication terminal had already been coupled previously in a simple manner.

An additional advantageous embodiment of the invention provides that, as soon as the wireless connection between the selected motor vehicle and the mobile communication terminal has been established, at least one previously deactivated functional unit of the motor vehicle is activated and particularly also controlled by the mobile communication terminal. In other words, by the targeted establishment of the wireless connection to one of the motor vehicles, the awakening of the previously deactivated motor vehicle may also be controlled. The fact that a corresponding wireless connection is established only after a targeted selection of one of the displayed motor vehicles has been made, in particular, an accidental wake-up of a previously deactivated motor vehicle is prevented. For example, an ignition, that is the status terminal 15 on, can be activated as soon as the wireless connection between the selected motor vehicle and the mobile communication terminal has been established. In addition, it may also be provided that, as soon as the wireless connection between the selected motor vehicle and the mobile communication terminal has been established, various functional units of the relevant motor vehicle, such as a stationary heater, window lifters, light settings, a horn or the like, can be controlled by means of the mobile communication terminal via a corresponding operating menu.

An additional advantageous embodiment of the invention provides that the functional unit is a parking assistant of the motor vehicle, wherein the mobile communication terminal controls the parking assistant such that the motor vehicle is automatically parked out of or parked into a parking space by means of the parking assistant, if a predetermined user input has been detected at the mobile communication terminal. In this context, it is also preferably provided that as soon as the wireless connection has been established, the ignition of the relevant motor vehicle is activated and a motor of the motor vehicle is started, so that the parking assistant, automatically controlled by the mobile communication terminal, can perform the automatic parking in and/or parking out process.

According to an additional advantageous embodiment of the invention, it is provided that, for determining whether a wireless connection can be established instantaneously between the mobile communication terminal and the displayed motor vehicle, a check is made as to whether respective request signals wirelessly and cyclically transmitted by the motor vehicles are received by the mobile communication terminal. In other words, the motor vehicles permanently transmit their availability, while these are deactivated. The motor vehicles may have a corresponding radio module by means of which trigger signals, which can be used as request signals, can be emitted as vehicle signals from the vehicle, for example in a two to three second interval, particularly also in the status of terminal 15 off.

An additional advantageous embodiment of the invention provides that for determining if a wireless connection can be established concurrently between the mobile communication terminal and the motor vehicles, it is checked in dependence on the received request signals transmitted wirelessly by means of the mobile communication terminal, if they are received by the motor vehicles by means of the mobile communication terminal. This ensures that corresponding wireless signals can also be received by the vehicle.

The inventive method for remotely controlling a motor vehicle comprises a mobile communication terminal, which is designed to display all motor vehicles of the system, with which the mobile communication terminal had already been coupled previously in the form of a wireless connection. Additionally, the inventive system comprises a control device, which is designed, if a wireless connection can be established concurrently with more than one of the displayed vehicles, to establish a wireless connection between one of these motor vehicles and the mobile communication terminal only once it has been detected that one of these motor vehicles has been selected by means of the mobile communication terminal. Furthermore, the control device is also designed to prevent a wireless connection between the mobile communication terminal and these motor vehicles, if a wireless connection can be established concurrently with more than one of the displayed vehicles, as long as none of these vehicles has been selected by means of the mobile communication terminal. Advantageous embodiments of the inventive method can be regarded as advantageous embodiments of the inventive system, wherein the system has, in particular, means for performing the steps of the method.

Further advantages, features and details of the invention arise from the following description of advantageous exemplary embodiments, as well as with reference to the drawing. The features and feature combinations mentioned above in the description, as well as the features and feature combinations mentioned below in the description of the drawing and/or mentioned only in the figures, can be used in the specified combination, but also in other combinations or alone without having to go beyond the scope of the invention.

Figure 2:
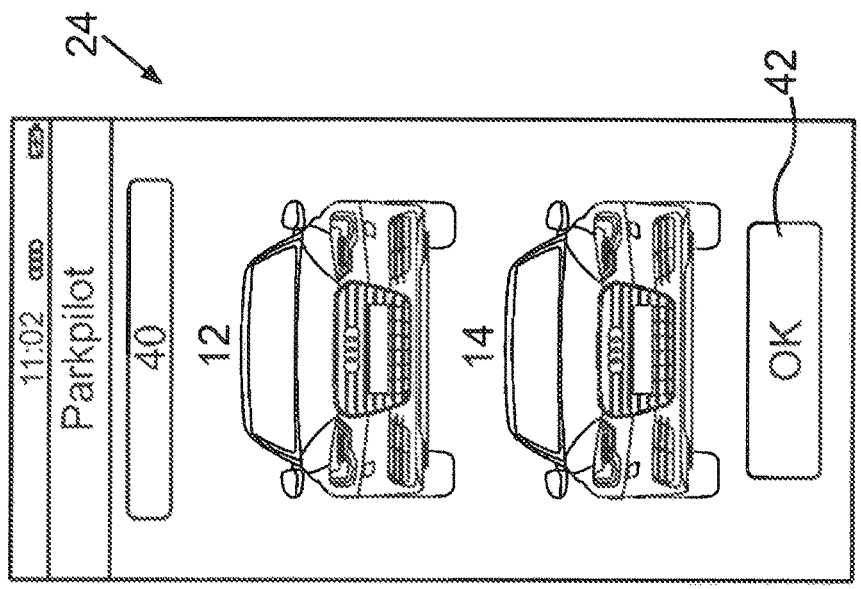
FIG. 2 illustrates a representation of the mobile communication terminal, which indicates the motor vehicle of the system, with which the mobile communication terminal had already been coupled before in the form of a wireless connection, in which case no wireless connection to one of the motor vehicles has yet been established.
Figure 3:
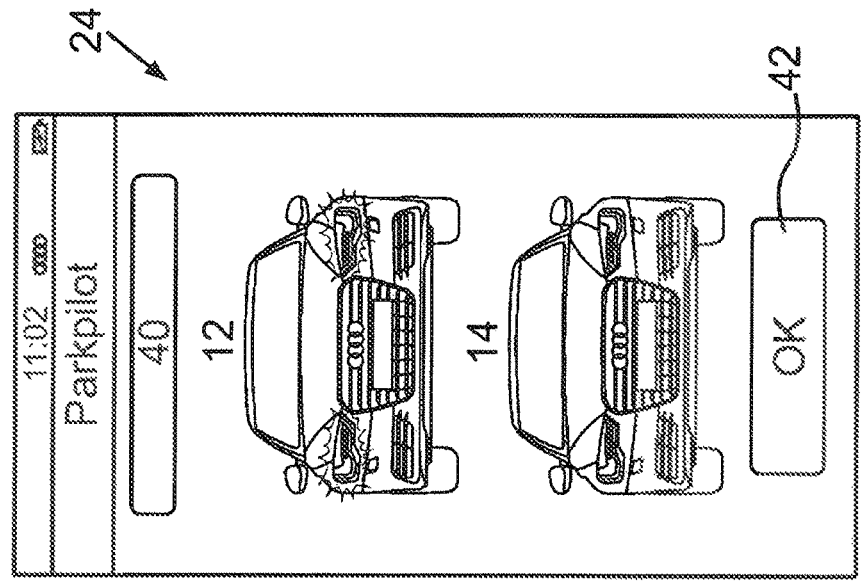
FIG. 3 illustrates once again the mobile communication terminal, by means of which the motor vehicles of the system are displayed, with which the mobile communication terminal had already been coupled before in the form of a wireless connection, whereby a wireless connection with one of the motor vehicles has been established in the present case.

The drawings show the following:

FIG. 1 illustrates a schematic representation of a system for remotely controlling a motor vehicle by means of a mobile communication terminal;

FIG. 2 illustrates a representation of the mobile communication terminal, which indicates the motor vehicle of the system, with which the mobile communication terminal had already been coupled before in the form of a wireless connection, in which case no wireless connection to one of the motor vehicles has yet been established; and FIG. 3 illustrates once again the mobile communication terminal, by means of which the motor vehicles of the system are displayed, with which the mobile communication terminal had already been coupled before in the form of a wireless connection, whereby a wireless connection with one of the motor vehicles has been established in the present case.

In the figures, the same or functionally equivalent elements are provided with the same reference characters.

A system, generally designated 10, for remotely controlling different motor vehicles 12, 14 is shown in a schematic representation in FIG. 1. The motor vehicles 12, 14 each have a radio module 16, 18 and in each case a control device 20, 22 connected to the radio modules 16, 18. The system 10 shown here also comprises a mobile communication terminal 24, which also has a radio module 26. The mobile communication terminal 24 may, for example, be a smart phone or a tablet computer.

The mobile communication terminal 24 is configured to display all motor vehicles 12, 14 of the system 10, with which the mobile communication terminal 24 had already been coupled before in the form of a wireless connection 28. The control devices 20, 22 are configured, if a wireless connection 28 can be established concurrently with more than one of the displayed motor vehicles 12, 14, to establish a wireless connection 28 between one of said motor vehicles 12, 14 and the mobile communication terminal 24 only as soon as it has been detected that one of said motor vehicles 12, 14 has been selected by means of the mobile communication terminal 24. Furthermore, the control devices 20, 22 are designed to prevent a wireless connection between the mobile communication terminal 24 and these motor vehicles 12, 14, if there is currently a wireless connection 28 possible with more than one of the displayed motor vehicles 12, 14, as long as none of these motor vehicles 12, 14 has been selected by means of the mobile communication terminal 24.

In the present case, the said control devices 20, 22 are part of the motor vehicles 12, 14. Instead, it may also be provided for the mobile communication terminal 24 to have a corresponding control device, which is configured in an analogous manner to establish the respective wireless connections 28 or to prohibit establishing the wireless connection 28.

A method for remotely controlling the motor vehicles 12, 14 by means of the mobile communication terminal 24 is explained in more detail below.

FIG. 2 shows the mobile communication terminal 24, which displays the two motor vehicles 12, 14, since they have already been connected in the form of a wireless connection 28. In the present case, respective illustrations of the motor vehicles 12, 14 are displayed by means of the mobile communication terminal 24. As an alternative or in addition, it is also possible, for example, to display a respective model designation, a name or the like for the respective motor vehicles 12, 14.

For determining, if a wireless connection 28 can be established concurrently between the mobile communication terminal 24 and the displayed motor vehicle 12, 14, it is checked if the respective wirelessly and cyclically transmitted request signals 30, 32 sent by the motor vehicles 12, 14 can be received by the mobile communication terminal 24. Additionally, for determining if a wireless connection 28 can be established concurrently between the mobile communication terminal 24 and the motor vehicles 12, 14, it is checked in dependence on the received response signals 34 transmitted wirelessly by means of the mobile communication terminal 24, if they are received by the motor vehicles 12, 14 by means of the mobile communication terminal 30, 32.

The range of the radio modules 16, 18 of the motor vehicles 12, 14 are schematically indicated with the radio ranges 36, 38. As can be seen, the mobile communication terminal 24 is located within the radio ranges of the radio modules 16, 18. For example, the two motor vehicles 12, 14 can be parked in a garage, which is not shown here, wherein a user of the communication terminal 24 is located in a home belonging to the garage so that the communication terminal 24 is still within the radio ranges 36, 38 of the radio modules 16, 18 of the motor vehicles 12, 14.

In the present case, both motor vehicles 12, 14 are characterized by means of the mobile communication terminal 24, with which a wireless connection 28 can be established concurrently with the mobile communication terminal 24. For example, the vehicles 12, 14 displayed by means of the mobile communication terminal 24 can also be provided with a radio symbol or the like as soon as it is possible to establish a wireless connection. Furthermore, for example, a message 40 may be displayed by means of the mobile communication terminal 24, as soon as a wireless connection with the motor vehicles 12, 14 can be established.

For example, the mobile communication terminal 24 is a smartphone with a touchscreen. In this case, by tapping the vehicle displayed by the mobile communication terminal 24, the user selects the vehicle 12 and confirms the selection by pressing the confirmation key 42.

FIG. 3 again shows the mobile communication terminal 24, whereby it can be seen that the displayed motor vehicle 12 is now optically highlighted. Once it has been detected that the motor vehicle 12 has been selected by the user by means of the mobile communication terminal 24, a wireless connection 28 is established between the mobile communication terminal 24 and the motor vehicle 12. For example, the wireless connection 28 may take place between the respective radio modules 26, 16 of the mobile communication terminal 24 and the motor vehicle 12. The motor vehicle 12 is now shown optically highlighted, as soon as the wireless connection 28 has been established, for example, as shown here in that a headlamp animation is displayed.

As soon as the wireless connection 28 has been established between the selected motor vehicle 12 and the mobile communication terminal 24, at least one previously deactivated functional unit of the motor vehicle 12 is activated by means of the mobile communication terminal 24 and, particularly, also controlled. For example, the functional unit is a parking assistant of the motor vehicle 12, wherein the mobile communication terminal 24 controls the parking assistant such that the motor vehicle is automatically parked out of or parked into a parking space by means of the parking assistant, if a predetermined user input has been detected at the mobile communication terminal 24. For example, after establishing the wireless connection 28 between the mobile communication terminal 24 and the motor vehicle 12, a corresponding graphical user interface (not shown here) can be displayed by means of the mobile communication terminal 24, by means of which the parking assistant can be controlled. To be able to carry out the automatic parking operation, an ignition of the motor vehicle 12 is activated at the latest after activation of the parking assistant, and then a motor of the motor vehicle 12 is started so that the automatic parking-in or parking-out operation can be performed.

In addition, it is also possible that, as soon as the wireless connection 28 has been established between the mobile communication terminal 24 and the motor vehicle 12, various functional units of the motor vehicle 12, such as a stationary heater, a window lifter, a lighting system, a horn or the like, can be remotely controlled by means of the mobile communication terminal 24.

By virtue of the fact that a wireless connection 28 can be established concurrently with more than one of the displayed motor vehicles 12, 14, the wireless connection 28 is established only after one of the two motor vehicles 12, 14 has been actively selected by a user, an inadvertent wake-up of the respective motor vehicles 12, 14 is particularly prevented.

If, contrary to the presentation in FIG. 1, a wireless connection 28 can be established instantaneously only with, one of the displayed motor vehicles 12, 14, a wireless connection 28 is established automatically between one of these motor vehicles 12, 14 and the mobile communication terminal 24. For example, it could happen that the motor vehicle 14 is located so far away from the motor vehicle 12 that no wireless connection can be established between the motor vehicle 14 and the mobile communication terminal 24. Even though, both motor vehicles 12, 14 are displayed by means of the mobile communication device 24, since a coupling had already been effected with the two vehicles 12, 14 beforehand. In this case, however, only motor vehicle 12 would be correspondingly marked by means of the mobile communication device 24, in order to make it clear to a user that a wireless connection can be established instantly only with said motor vehicle 12. Alternatively, however, it can also be provided that an active selection of the motor vehicles 12, 14 must always take place via the mobile communication terminal 24, before a wireless connection 28 is established with the relevant motor vehicle 12, 14.

As soon as, after the wireless connection 28 has been established between the mobile communication terminal 24 and the motor vehicle 12, the other motor vehicle 14 is selected on the mobile communication terminal 24, the previously established wireless connection 28 between the mobile communication terminal 24 and the motor vehicle 12 is interrupted, and a wireless connection 28 is established with the other motor vehicle 14—as far as this is possible. A user can thus interrupt the previously established wireless connections 28 in a particularly simple manner and establish new wireless connections with other motor vehicles, with which the mobile communication terminal 24 has already been previously coupled.

A vehicle-specific or function-specific application is preferably installed on the mobile communication terminal 24, by means of which the method steps explained above can be carried out. Thus, a selective connection selection is enabled with the different already previously coupled motor vehicles 12, 14, whereby it is also possible at any time to change the wireless connections via this application. Furthermore, the application also makes it possible to wake up previously deactivated motor vehicles.

The invention claimed is:

1. A method for remotely controlling a motor vehicle by a mobile communication terminal, the method comprising:
   displaying motor vehicles, by the mobile communication terminal, with which the mobile communication terminal has been previously coupled, using a prior wireless connection; and
   if a wireless connection can be established concurrently with a plurality of the motor vehicles:
      establishing a new wireless connection between a first motor vehicle of the plurality of the motor vehicles and the mobile communication terminal in response to detecting that the first motor vehicle has been selected,
      prohibiting establishment of the new wireless connection between the mobile communication terminal and each of the plurality of the motor vehicles until the first motor vehicle has been selected, and
      after the new wireless connection has been established between the mobile communication terminal and the first motor vehicle, and in response to a second motor vehicle of the plurality of the motor vehicles having been selected on the mobile communication terminal, interrupting the new wireless connection between the mobile communication terminal and the first motor vehicle and establishing a new wireless connection between the mobile communication terminal and the second motor vehicle.

2. The method of claim 1, further comprising:
   marking, by the mobile communication terminal, the plurality of the motor vehicles with which the mobile communication terminal has the ability to establish the wireless connection.

3. The method of claim 1, further comprising:
   optically emphasizing the first motor vehicle, by the mobile communication terminal, after establishing the new wireless connection between the mobile communication terminal and the first motor vehicle.

4. The method of claim 1, further comprising:
   if a wireless connection can be established instantaneously with only one of the motor vehicles, automatically establishing the new wireless connection between the mobile communication terminal and the one of the motor vehicles.

5. The method of claim 1, further comprising:
   after the new wireless connection has been established between the mobile communication terminal and the first motor vehicle, activating and controlling, by the mobile communication terminal, at least one previously deactivated functional unit of the first motor vehicle.

6. The method of claim 5, wherein the at least one previously deactivated functional unit is a parking assistant of the first motor vehicle, and wherein the mobile communication terminal controls the parking assistant such that the first motor vehicle is automatically parked out of or parked into a parking space by the parking assistant based on detection of a predetermined user input at the mobile communication terminal.

7. The method of claim 1, further comprising:
determining if the wireless connection can be established concurrently with the plurality of the motor vehicles based on the mobile communication terminal wirelessly receiving cyclically transmitted request signals from the plurality of the motor vehicles.

8. The method of claim 7, further comprising:
determining whether any response signals, wirelessly transmitted by the mobile communication terminal in response to the received cyclically transmitted request signals, are being received by the plurality of the motor vehicles.

9. A system for remotely controlling a motor vehicle, the system comprising:
a display of a mobile communication terminal configured to display motor vehicles associated with the system with which the mobile communication terminal has been previously coupled, using a prior wireless connection; and
a control device of the mobile communication terminal configured, based on an ability to establish a wireless connection concurrently with a plurality of the motor vehicles, to:
establish a new wireless connection between a first motor vehicle of the plurality of the motor vehicles and the mobile communication terminal in response to detecting that the first motor vehicle has been selected,
prohibit establishment of the new wireless connection between the mobile communication terminal and each of the plurality of the motor vehicles until the first motor vehicle has been selected, and
after the new wireless connection has been established between the mobile communication terminal and the first motor vehicle, and in response to a second motor vehicle of the plurality of the motor vehicles having been selected on the mobile communication terminal, interrupt the new wireless connection between the mobile communication terminal and the first motor vehicle and establish a new wireless connection between the mobile communication terminal and the second motor vehicle.

* * * * *